United States Patent [19]

Williman

[11] Patent Number: 5,706,328
[45] Date of Patent: Jan. 6, 1998

[54] AUTOMATED INBOUND TEST FACILITY AND METHOD

[75] Inventor: Glenn Stuart Williman, Oakhurst, N.J.

[73] Assignee: AT&T, Middletown, N.J.

[21] Appl. No.: 665,130

[22] Filed: Jun. 14, 1996

[51] Int. Cl.⁶ .................. H04M 3/08; H04M 3/22; H04M 3/42
[52] U.S. Cl. .................. 379/1; 379/9; 379/201; 379/283
[58] Field of Search .................. 379/1, 9, 10–15, 379/97, 98, 102, 112, 114, 115, 121, 34, 188, 157, 189, 201, 207, 210.2 R, 280, 283, 196, 197

[56] References Cited

U.S. PATENT DOCUMENTS

| | | |
|---|---|---|
| 4,893,335 | 1/1990 | Fuller et al. ............... 379/201 |
| 4,899,373 | 2/1990 | Lee et al. ................... 379/201 |
| 5,241,580 | 8/1993 | Babson, III ................. 379/15 |

*Primary Examiner*—Curtis Kuntz
*Assistant Examiner*—Paul Loomis
*Attorney, Agent, or Firm*—Robert B. Levy

[57] ABSTRACT

A technique is provided for enabling remote testing of a telecommunications service provided by an international gateway switch (12). To accomplish such testing, a test facility (10) associated with the switch includes a DTMF interface (16) for automatically answering an inbound call and for verifying if the caller may access the service for testing purposes. The test facility also includes a signal converter (38) for translating DTMF signals entered during the inbound call to yield an activation sequence of signals for input to the international gateway switch to activate the service offered by the switch for testing purposes.

8 Claims, 1 Drawing Sheet

AUTOMATED INBOUND TEST FACILITY AND METHOD

TECHNICAL FIELD

This invention relates to a technique for remotely testing a telecommunications service via an inbound telephone call.

BACKGROUND ART

Telecommunications carriers, such as AT&T, offer a variety of domestic and international services. One international service offered by AT&T is USADirect service whereby an overseas caller can dial a local, in-country number and be directly routed to the United States via an AT&T trunk that terminates at a selected domestically located international gateway switch. Each such international gateway switch is subject to routine software upgrades to maintain the quality of service as well as to provide enhanced feature functionality.

Often, the development of switch software upgrades occurs at one or more locations that are distant from the location of the international gateway switch in which such upgrades are installed. While software upgrades can sometimes be downloaded remotely, the ability to remotely monitor the performance of an international gateway switch following a software upgrade can prove problematic. To handle inbound international traffic, each international gateway switch is provided with an international interface to render it compatible with a corresponding gateway switch of an originating international telephone carrier, such as a foreign PTT. Attempting to access a domestic international gateway switch via a domestic interface is usually fraught with difficulty because the signaling associated with a domestic interface is different from that associated with the international interface. In the past, a domestically originated call could not precisely duplicate the international call processing protocol needed to check an international gateway switch.

One possible approach to accomplishing testing of the features of an international gateway switch is to provide a special domestic interface compatible with that of the switch. However, providing such a special interface is costly and time consuming. Thus, there is need for a technique for enabling remote testing of a telecommunications service, such as the USADirect service, without the aforementioned difficulties.

BRIEF SUMMARY OF THE INVENTION

Briefly, in accordance with the invention, a method is provided for remotely checking a telecommunications service available to callers. The method of the invention is practiced by automatically answering a telephone call placed remotely for the purpose of checking the service. After automatically answering the call, a first sequence of Dual Tone Multi-Frequency (DTMF) signals, generated for the purpose of gaining access to check the service, is received. The first sequence of DTMF signals is verified, typically by comparison against a prescribed sequence of access DTMF signals, to determine whether access will be permitted. If the first sequence of DTMF signals is correct, then the entry of a second sequence of DTMF signals is prompted. The second sequence of signals is generated and entered for the purpose of rendering the telecommunications service active. Following entry of the second sequence of DTMF signals, the sequence is translated into signals, including supervisory signals, of a format recognized for activating the telecommunications service. Thereafter, the inbound call is connected to the service for the purpose of checking the service.

DETAILED DESCRIPTION

Figure 1:
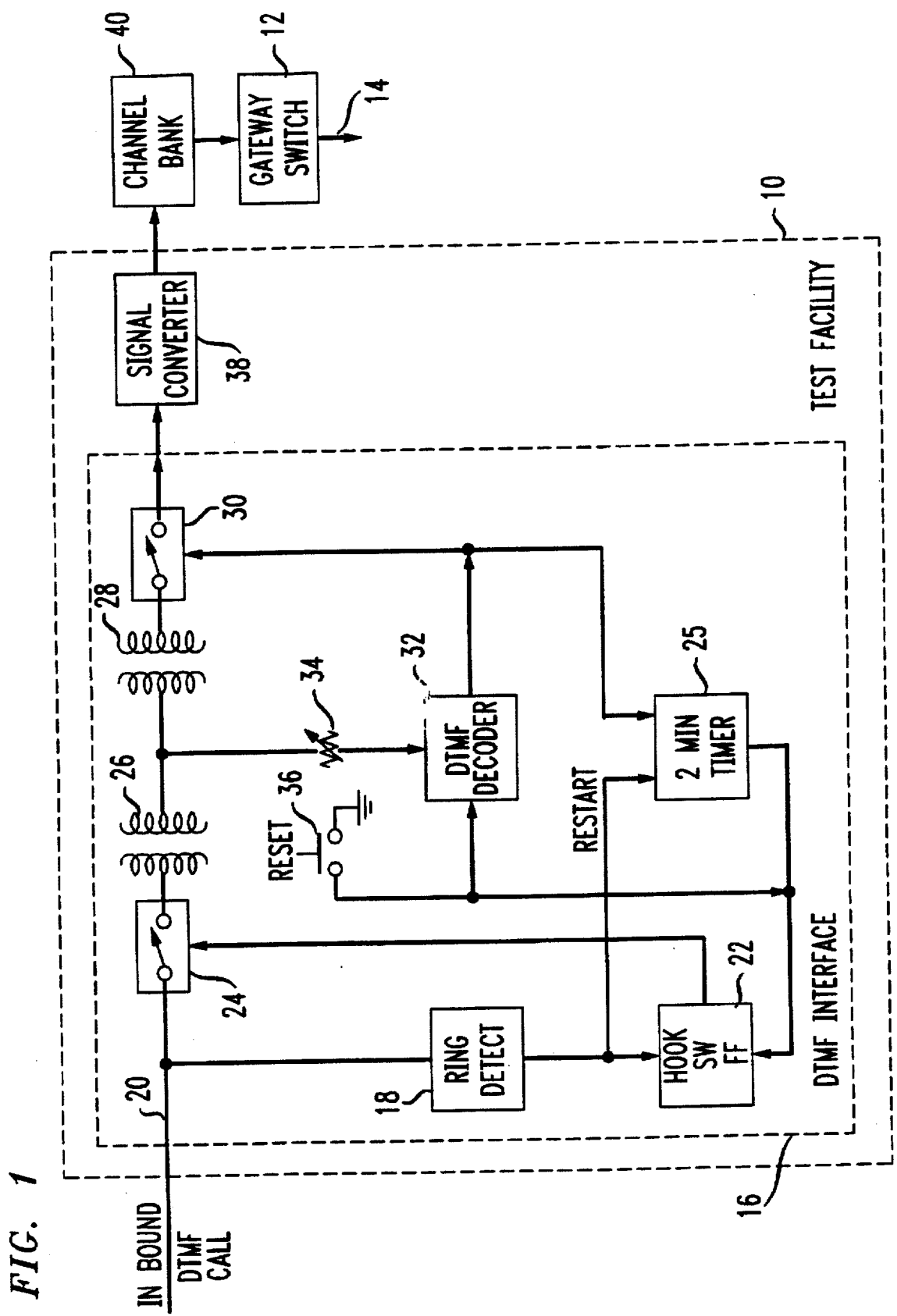
FIG. 1 is a block schematic diagram of an automated inbound test facility for testing a telecommunications service in accordance with the invention.

FIG. 1 discloses a test facility 10 in accordance with the invention for enabling remote testing of a telecommunications service provided by an international gateway telecommunications switch 12, such as a 4ESS switch formerly manufactured by AT&T. In the illustrated embodiment, the telecommunications service offered by the international gateway switch 12 and tested by the test facility 10 is AT&T's USADirect service. In accordance with this service, an overseas caller (not shown) dials a local, in-country number. The call to the in-country number is ultimately routed onto a trunk 14 that terminates at the international gateway switch 12 that is located domestically.

In the illustrated embodiment, the international gateway switch 12 has an international interface so that international calls routed on the trunk 14 can be readily processed at the switch. As a consequence of the international interface provided to the international gateway switch 12, past testing the USADirect telecommunications service remotely via a domestic DTMF phone call has proven problematic because of the inability to precisely simulate the international call processing needed to test this service.

The test facility 10 of the invention overcomes the aforementioned difficulty by providing a mechanism for accepting and verifying a remotely-initiated DTMF call and for performing the necessary signal translation to simulate an international inbound call for receipt by the international gateway switch 12 for testing purposes. The test facility 10 accomplishes acceptance and verification of an inbound DTMF call via a DTMF interface 16. The DTMF interface 16 includes a ring detector 18 for sensing the ringing of an inbound call routed on a trunk 20 coupled to the interface. Upon sensing call ringing, the ring detector 18 triggers a hook switch flip-flop 22, which in turn, actuates a relay 24 to connect the trunk 20 to the primary of a first transformer 26 that places an impedance on the trunk to complete set-up of the inbound call to the DTMF interface 16.

When the ring detector 18 detects ringing on the trunk 20, the ring detector starts a timer 25 that times out after a predetermined time interval (e.g., two minutes). Upon timing out, the timer 25 generates a signal that clears the hook switch flip-flop 22. When cleared, the hook switch flip-flop 22 de-actuates the relay 24, causing the relay to open and thereby disconnect the inbound call.

The transformer 26 has its secondary coupled to the primary of a second transformer 28 whose secondary is coupled to an input terminal of a relay 30. The relay 30 is controlled by a DTMF decoder 32 that has its signal input coupled to the secondary of the transformer 26 via a potentiometer 34 that varies the level of the incoming signal received by the decoder. As may be appreciated, while the relay 24 is closed, the DTMF decoder 32 receives DTMF signals present on the inbound trunk 20. The DTMF decoder 32 is programmed to detect prescribed sequences of DTMF signals as well as to prompt the entry of DTMF signals. Upon detecting a first prescribed sequence of signals, (i.e., an "access" sequence), the DTMF decoder 32 triggers the relay 30 and stops the timer 25 from running. Should the timer 25 time out prior to the receipt of the access sequence from the DTMF decoder 32, then the timer will not only clear the hook switch flip-flop 22, but will also reset the DTMF decoder 32. The DTMF decoder 32 may be manually reset via a reset switch 36 that also resets the flip- flop 22. When both of the relays 24 and 30 are closed, a call path is completed through the DTMF interface 16. In response to the appropriate access sequence of DTMF signals, the DTMF decoder 32 generates a prompt to signal the caller placing the inbound call to enter a second sequence (i.e., a "service activation" sequence) of DTMF signals.

In operation, the DTMF interface 16 automatically answers an inbound call on the trunk 20 when the relay 24 triggers upon the ring detector 18 sensing ringing on the trunk. At the same time the relay 24 triggers, the timer 25 starts running. If the DTMF decoder 32 detects a first prescribed sequence of DTMF signals, then the decoder trips the relay 30 so that a completed call path is provided through the DTMF interface 16. At the same time, the DTMF decoder 32 stops the timer 25 and also prompts the entry of a second sequence of DTMF signals whose function will be described hereinafter. As may be appreciated, unless the DTMF decoder 32 detects the presence of the first prescribed sequence of DTMF signals, the decoder will not trigger the relay 30 and will not stop the timer 31. In this way, an inbound call to the test facility 10 will not proceed beyond the DTMF interface 16 unless verified by entry of the proper DTMF access signal sequence.

In addition to the DTMF interface 16, the test facility 10 of the invention also includes a signal converter 38 which in the illustrated embodiment may comprise the combination of a TEL 100 and a TEL 200 signal converter manufactured by Anadigicom. The signal converter 38 converts (i.e., translates) the second (service activation) sequence of DTMF signals entered during the inbound call into a stream of signals, including supervisory signals, of a format recognized by the international gateway switch 12 to activate a service provided by the switch. In the illustrative embodiment, the signals (including supervisory signals) output by the signal converter 38 simulate a dial tone of a type utilized for international calls for the purpose of testing the USADirect service provided by the international gateway switch 12. Additionally, the signaling converter 38 generates an ITU-T #5 type supervisory signaling that would normally be associated with USADirect calls received by the international gateway switch 12. Lastly, the international interface associated with the international gateway switch 12 is typically of the four-wire type whereas the DTMF call initiated on the trunk 20 for testing purposes is typically of the two-wire type. Thus, the signaling converter 38 also performs the necessary two- wire to four- wire conversion needed to interface a two-wire DTMF call to the international gateway switch 12.

The stream of signals generated by the signaling converter 38 are outpulsed to a channel bank 40 that acts as a multiplexer to place the outpulsed signals in an appropriate time slot for receipt by the international gateway switch 12. Other transmission mechanisms for coupling the signal converter 38 to the international gateway switch 12 could be substituted as appropriate. In response to the signals from the signal converter 38, the international gateway switch 12 recognizes the signals and provides the service to the inbound call specified by the signals. In the preferred embodiment, the international gateway switch 12 provides the inbound test call with USADirect service, including, but not limited to, the prompts associated with such service. In this way, the caller placing the inbound call can invoke the service(s) offered by the international gateway switch 12 for testing and/or monitoring purposes.

To conclude the inbound test call, the caller enters a third sequence of DTMF signals. If the third sequence of DTMF signals constitutes a proper disconnect sequence, the DTMF decoder 32 within the DTMF interface 16 automatically clears the connection to the international gateway switch 12 by de-actuating the relay 30. Further, the DTMF decoder 32 also starts the timer 25. If no other action is taken by the caller who placed the inbound test call, then the timer 25 will time out and trigger the hook switch flip-flop 22 to de-actuate the relay 24 to disconnect the call. To initiate another test call, another inbound test call must be made, and the appropriate DTMF access sequence would have to be entered, followed by the appropriate service activation sequence.

The foregoing describes a technique for checking a telecommunications service remotely via an inbound DTMF call. Although the invention has been described with respect to a single type of international service (AT&T USADirect service), the technique of the invention is readily applicable to other types of service. To effectuate remote checking of other services, an appropriate service activation sequence would have to be entered to the signaling converter 38 to cause the converter to generate the particular stream of signals (including supervisory signals) needed to render the service provided by the international gateway switch active to the caller.

It is to be understood that the above-described embodiments are merely illustrative of the principles of the invention. Various modifications and changes may be made thereto by those skilled in the art which will embody the principles of the invention and fall within the spirit and scope thereof.

The invention claimed is:

1. A method for remotely checking a telecommunications service available to callers, comprising the steps of:

automatically answering an in-bound telephone call initiated to check the service;

receiving, during said inbound telephone call, a first sequence of DTMF signals generated for the purpose of gaining access to the service;

verifying if said first sequence of DTMF signals corresponds to a prescribed access sequence of DTMF signals, and if so, then prompting the entry of a second sequence of DTMF signals generated to cause the telecommunications service to become active;

receiving and translating said second sequence of DTMF signals into a sequence of activation signals of a format recognized for activating said telecommunication service; and providing a connection between said call and said telecommunications service so said service is active with respect to said call.

2. The method according to claim 1 including the step of disconnecting said inbound call following a predetermined interval after automatically answering said call if said first sequence of DTMF signals does not correspond to said prescribed access sequence of DTMF signals.

3. The method according to claim 1 further including the steps of:

receiving a third sequence of DTMF signals;

verifying if said third sequence of DTMF signals corresponds to a prescribed disconnect sequence of DTMF signals; and if so disconnecting said inbound call.

4. The method according to claim 1 wherein the second sequence of DTMF signals are translated so that said sequence of activation signals causes said inbound call to simulate an international telephone call.

5. A method for remotely checking a telecommunications service offered by an international gateway switch, comprising the steps of:

automatically answering, at a test facility associated with said switch, an in-bound telephone call initiated at a location remote from said test facility to check the service;

receiving, during said inbound telephone call, a first sequence of DTMF signals generated for the purpose of gaining access to check the service;

verifying at said test facility if said first sequence of DTMF signals corresponds to a prescribed access sequence of DTMF signals, and if so, then prompting the entry of a second sequence of DTMF signals generated to cause the telecommunications service to become active;

receiving and translating at said test facility said sequence of DTMF signals into a second sequence of signals, including supervisory signals, of a format recognized for activating said telecommunication service; and providing a connection between said test facility and said international gateway switch to activate said telecommunications service so said service is active with respect to said call.

6. The method according to claim 5 including the step of disconnecting said inbound call following a predetermined interval after automatically answering said call if said first sequence of DTMF signals does not correspond to said prescribed access sequence of DTMF signals.

7. The method according to claim 5 further including the steps of:

receiving a third sequence of DTMF signals;

verifying if said third sequence of DTMF signals corresponds to a prescribed disconnect sequence of DTMF signals; and if so disconnecting said inbound call.

8. The method according to claim 5 wherein the second sequence of DTMF signals are translated so that said sequence of activation signals causes said inbound call to simulate an international telephone call.

* * * * *